F. W. PRAMSCHÜFER.
SPRING WHEEL.
APPLICATION FILED NOV. 20, 1912.
1,081,146.
Patented Dec. 9, 1913.
2 SHEETS—SHEET 1.
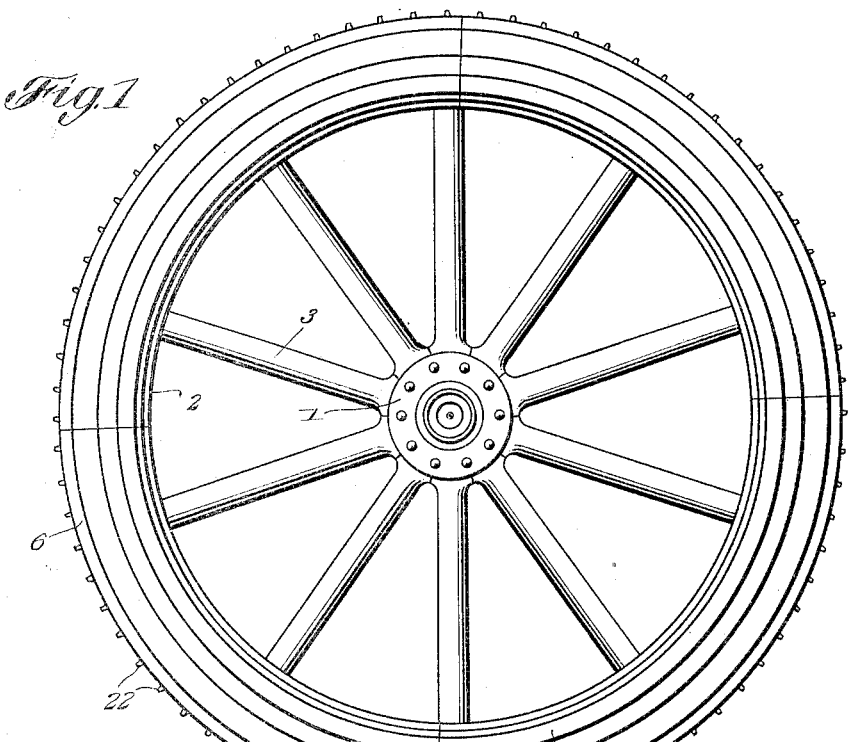
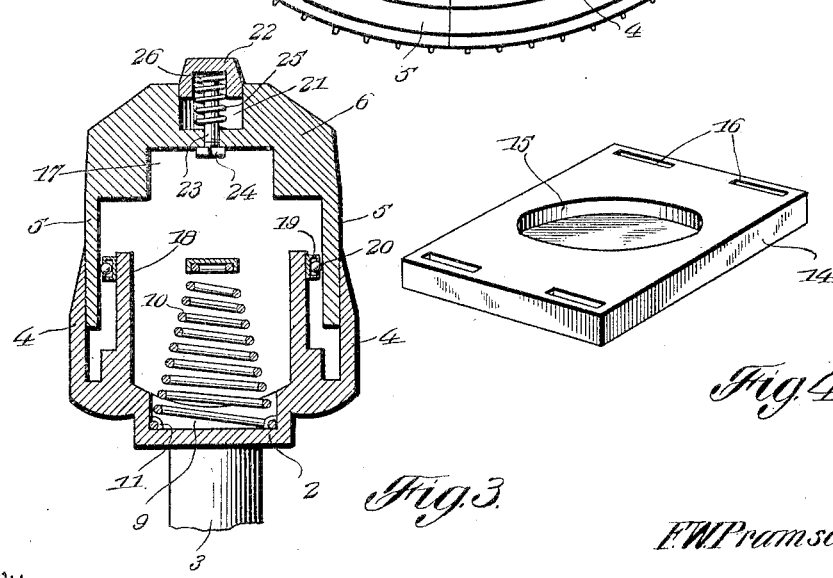
Witnesses
J. W. Crawford.
P. M. Smith.
Inventor
F. W. Pramschüfer,
By Victor J. Evans
Attorney F. W. PRAMSCHÜFER.
SPRING WHEEL.
APPLICATION FILED NOV. 20, 1912.
1,081,146.
Patented Dec. 9, 1913.
2 SHEETS—SHEET 2.
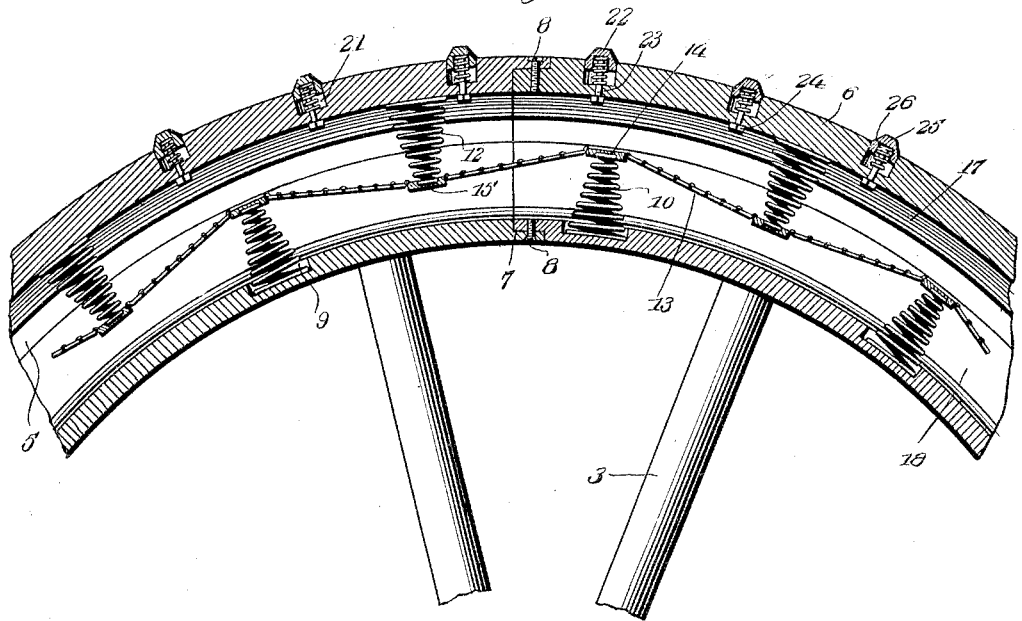
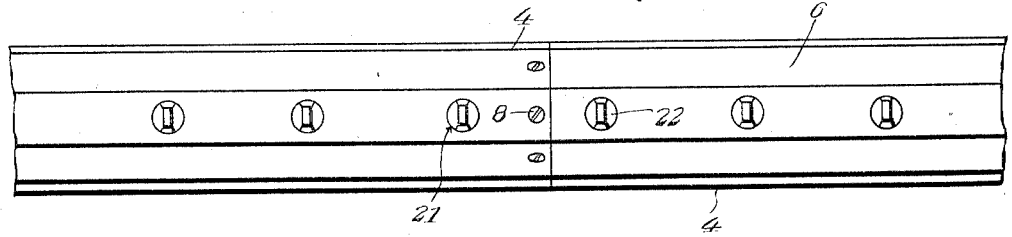
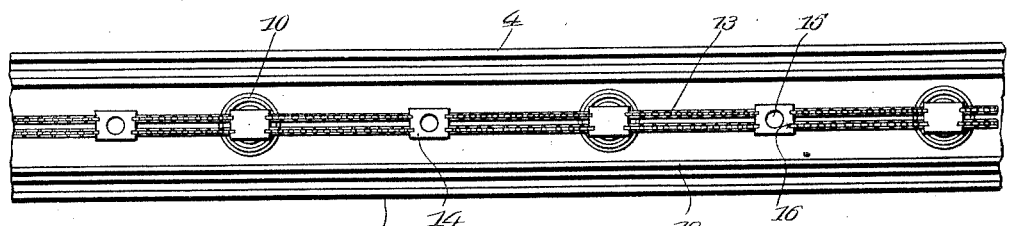
Witnesses
J. H. Crawford.
P. M. Smith.
Inventor
F. W. Pramschüfer,
By Victor J. Evans
Attorney

UNITED STATES PATENT OFFICE.

FRANZ W. PRAMSCHÜFER, OF BALTIMORE, MARYLAND.

SPRING-WHEEL.

1,081,146.  Specification of Letters Patent.  Patented Dec. 9, 1913.

Application filed November 20, 1912. Serial No. 732,500.

*To all whom it may concern:*

Be it known that I, FRANZ W. PRAM-SCHÜFER, a citizen of the United States, residing at Baltimore, in the State of Maryland, have invented new and useful Improvements in Spring-Wheels, of which the following is a specification.

This invention relates to spring wheels, the object in view being to provide a simple, practical and reliable arrangement of rim, tire and interposed yielding connections and devices, by means of which the use of a pneumatic tire is done away with and the necessary resiliency or spring action retained in the wheel itself to insure absorbing all jars and vibrations, and preventing the transmission thereof to the axles and body of the vehicle.

With the above and other objects in view, the invention consists in the construction, combination and arrangement of parts, as will be hereinafter more fully described, illustrated in the accompanying drawings, and pointed out in the claims hereunto appended.

In the accompanying drawings: Figure 1 is a side elevation of a wheel, embodying the present invention. Fig. 2 is a longitudinal view on an enlarged scale through a portion of the rim and tire, showing the connections between the same. Fig. 3 is a cross section through the rim and tire on an enlarged scale. Fig. 4 is a detail perspective view of one of the spring caps. Fig. 5 is an outer face view of a portion of the tire. Fig. 6 is an outer face view of a portion of the rim, showing the chain, springs, etc.

Referring to the drawings, 1 designates a wheel hub, 2 the wheel rim, and 3 the spokes connecting the hub and rim.

By reference to Fig. 3, it will be seen that the rim 2 comprises the parallel side flanges 4, between which slide the corresponding side flanges 5 of the tire 6.

By reference to Figs. 1 and 2, it will be observed that in the preferred embodiment of this invention, the rim 2 and the tire 6 are made up of sections which are joined together, as shown in Fig. 2, by rabbeting the meeting edges of the sections, as shown at 7, and securing such rabbeted and overlapping portions of the sections together by means of screws 8, or their equivalent. This sectional construction is particularly desirable in the tire 6, in order to enable the tire to be applied to and removed from the rim. The rim 2 is provided at intervals with sockets 9 forming seats for the inner ends of a series of coiled springs 10. These springs are preferably made conical or pyramidal shaped, with their larger ends seated in the sockets 9, in which are arranged keeper eyes 11, through which the inner extremity of each spring is passed, in order to attach the spring to the rim. Similar springs 12 have their larger ends connected to the tire 6 in the same manner, as shown in Fig. 2, wherein it will also be observed that the springs are alternately attached to the rim and the tire.

13 designates a pair of endless chains which extend entirely around the rim, and within the tire, and are alternately supported in opposite directions by the springs 10 and 12. The chain or chains have incorporated therein, at suitable intervals, spring caps 14, one of which is illustrated in detail in Fig. 4, wherein said cap is seen to comprise a recessed spring seat 15, in which the smaller end of one of the springs is received, in the manner shown in Fig. 2. The cap also comprises slots 16 at or near the four corners thereof, which slots receive the end links of the sections of the chain or chains, as is best illustrated in Fig. 6. While two chains are shown in Fig. 6, it will be apparent that one or more chains may be used, according to the desire of the manufacturer, and in accordance with the size of the wheel and the load to be imposed thereon. The springs 10 and 12 may also be varied in size and strength, to suit such and other conditions. The spring caps 14 are, of course, reversely disposed, as shown in Fig. 2, so as to fit over the inner ends of the staggered springs. By this means, the chain couples all of the springs together, so that they mutually assist each other in properly supporting the tire on the rim, while the flanges 5 and 4 of the tire and rim, respectively, slide in contact with each other both radially and circumferentially. The tire 6 like the rim 2 is provided with sockets 17 to receive the larger ends of the outer series of springs 12.

In addition to the side flanges 4, the rim is provided with other inside flanges 18 parallel to each other and the flanges 5 of the tire. Annular ball races 19 are interposed between the flanges 5 and 18, as shown in Fig. 3, and are filled with anti-friction balls 20. These ball races 19 are preferably attached permanently to the inside flanges 18, while the balls 20 work in contact with the inner faces of the side flanges 5 of the tire. This prevents any binding action between the tire and the rim and provides for a free sliding movement between the flanges of the tire and rim which will insure the full action and utilization of the springs 10 and 12.

In its outer tread face, the tire 6 is provided at suitable intervals with recesses 21, in which are mounted anti-skid knobs 22 movable radially with respect to the axis of the wheel. Each of said knobs 22 has attached thereto an inwardly extending stem 23, on the inner end of which is threaded a nut 24 which limits the outward movement of the knob. A coiled spring 25 encircles the stem 23, and has its outer end received in a recess 26 within the knob 22, while the inner end of said spring rests against the floor of the recess 21. In this way, any suitable number of yieldingly supported anti-skid knobs may be provided which will add materially to the traction of the wheel, and prevent the same from skidding or spinning around, when a machine is traveling upon soft ground.

The tire may be manufactured separately from the wheel, if desired, and may be adjusted easily to any wheel of corresponding size, in the same manner as the ordinary quick detachable tire now in common use.

What is claimed is:

1. A wheel, comprising a hub, spokes, a rim embodying side flanges, a tire embodying side flanges sliding in contact with the rim flanges, an endless chain extending circumferentially around the rim and within the tire, springs arranged alternately at opposite sides of said chain and interposed between said chain and the rim and tire, and spring holding caps included in and forming parts of said chain.

2. A wheel, comprising a hub, spokes, a rim embodying side flanges, a tire embodying side flanges sliding in contact with the rim flanges, an endless chain extending circumferentially around the rim and within the tire, springs arranged alternately at opposite sides of said chain and interposed between said chain and the rim and tire, and spring holding caps included in and forming parts of said chain and provided with recessed seats in which the ends of the springs are held.

In testimony whereof I affix my signature in presence of two witnesses.

FRANZ W. PRAMSCHÜFER.

Witnesses:
JOHN HENRY STEEN,
ISABELLE TYLER.

---

Copies of this patent may be obtained for five cents each, by addressing the "Commissioner of Patents, Washington, D. C."